(12) United States Patent
Matsuda et al.

(10) Patent No.: US 10,859,767 B2
(45) Date of Patent: Dec. 8, 2020

(54) OPTICAL FIBER CUTTER

(71) Applicants: Fujikura Ltd., Tokyo (JP); NIPPON TELEGRAPH AND TELEPHONE CORPORATION, Tokyo (JP)

(72) Inventors: Takaharu Matsuda, Sakura (JP); Kunihiko Fujiwara, Sakura (JP); Ryo Koyama, Tsukuba (JP); Mitsuru Kihara, Tsukuba (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 16/462,495

(22) PCT Filed: Nov. 20, 2017

(86) PCT No.: PCT/JP2017/041641
§ 371 (c)(1),
(2) Date: May 20, 2019

(87) PCT Pub. No.: WO2018/097094
PCT Pub. Date: May 31, 2018

(65) Prior Publication Data
US 2019/0339453 A1    Nov. 7, 2019

(30) Foreign Application Priority Data

Nov. 22, 2016  (JP) ................................ 2016-227163

(51) Int. Cl.
  *G02B 6/25*    (2006.01)
  *G02B 6/36*    (2006.01)
(52) U.S. Cl.
  CPC ............. *G02B 6/25* (2013.01); *G02B 6/3616* (2013.01); *G02B 6/3636* (2013.01); *G02B 6/3652* (2013.01)

(58) Field of Classification Search
  CPC ...... G02B 6/25; G02B 6/3652; G02B 6/3636; G02B 6/3616
  See application file for complete search history.

(56) References Cited

U.S. PATENT DOCUMENTS 4,274,572 A    6/1981  Dunn et al.
4,667,862 A  *  5/1987  Millar ..................... G02B 6/25
                                                            225/2

(Continued)

FOREIGN PATENT DOCUMENTS

JP    S53-012339 A    2/1978
JP    S55-060035 A    5/1980

(Continued)

OTHER PUBLICATIONS

Office Action issued in corresponding Japanese Patent Application No. 2016-227163 dated Dec. 19, 2017 (3 pages).

(Continued)

*Primary Examiner* — Leslie C Pascal
(74) *Attorney, Agent, or Firm* — Osha Bergman Watanabe & Burton LLP

(57) ABSTRACT

An optical fiber cutter includes: a base member; a movable member that clamps the optical fiber extending from a fiber holder and that moves with respect to the base member between an advanced position and a retracted position in an extending direction of the optical fiber; a biasing member that biases the movable member at the retracted position forward; a locking member that regulates forward movement of the movable member at the retracted position; a cutter supporter that supports a blade that forms an initial cut in the optical fiber, that moves in a direction that intersects with the extending direction of the optical fiber, and that forms the initial cut at an initial cut forming position between the fiber holder and the movable member; and an unlocking member that releases the regulation of forward (Continued)

movement of the movable member before the blade reaches the initial cut forming position.

6 Claims, 10 Drawing Sheets

(56) References Cited

U.S. PATENT DOCUMENTS

| | | | |
|---|---|---|---|
| 6,189,757 B1 * | 2/2001 | Yoshida | G02B 6/25 225/94 |
| 2003/0077062 A1 | 4/2003 | Sasaki et al. | |
| 2012/0018482 A1 * | 1/2012 | Pepin | G02B 6/25 225/2 |
| 2013/0156377 A1 * | 6/2013 | DeMeritt | G02B 6/3885 385/59 |
| 2014/0069979 A1 | 3/2014 | Kruzel | |
| 2015/0128779 A1 | 5/2015 | Zhao | |

FOREIGN PATENT DOCUMENTS

| | | |
|---|---|---|
| JP | S63-113101 U | 7/1988 |
| JP | H01-073807 U | 5/1989 |
| JP | H1-270005 A | 10/1989 |
| JP | 2003-202425 A | 7/2003 |
| JP | 2012-524297 A | 10/2012 |
| JP | 2013-137445 A | 7/2013 |
| JP | 2014-238574 A | 12/2014 |
| WO | 2010/120570 A2 | 10/2010 |
| WO | 2016/170889 A1 | 10/2016 |

OTHER PUBLICATIONS

Notice of Allowance issued in corresponding Japanese Patent Application No. 2016-227163 dated Apr. 17, 2018 (3 pages).

* cited by examiner

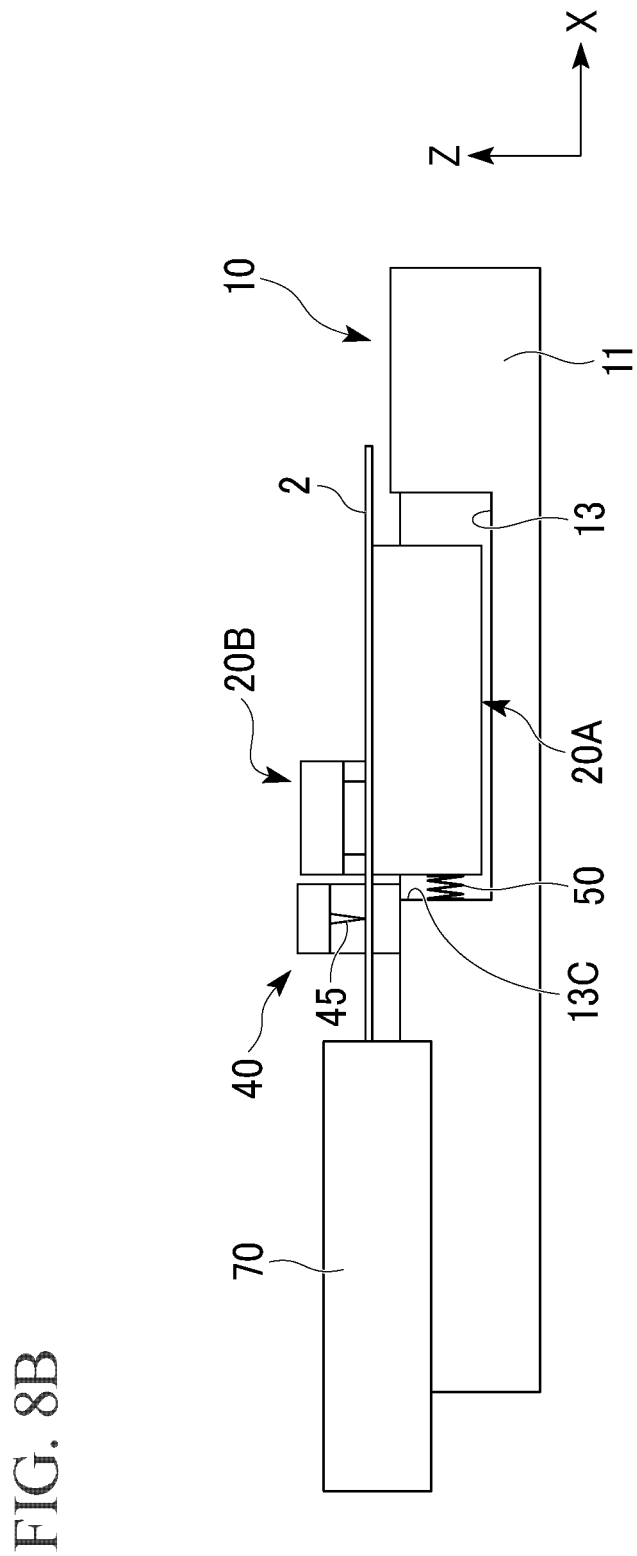

OPTICAL FIBER CUTTER

CROSS-REFERENCE TO RELATED APPLICATIONS

The present application is a U.S. National Stage application of International Application No. PCT/JP2017/046146 filed Dec. 22, 2017, which claims priority from Japanese Patent Application No. 2016-227163 filed Nov. 22, 2016. The contents of these applications are incorporated herein by reference in their entirety.

TECHNICAL FIELD

The present disclosure relates to an optical fiber cutter.

BACKGROUND

For example, when an optical fiber is cut, a fiber cutter forms an initial cut in the optical fiber in a state in which tension is applied to the optical fiber, grows the initial cut by the tension applied to the optical fiber, and cuts the optical fiber by cleavage (see, for example, Patent Document 1). Such a fiber cutter holds an optical fiber by a first optical fiber holder and a second optical fiber holder in a state in which tension is applied between the first optical fiber holder and the second optical fiber holder. Subsequently, an initial cut is formed between the first optical fiber holder and the second optical fiber holder. Then, the initial cut in the optical fiber grows due to tension between the first optical fiber holder and the second optical fiber holder, and the optical fiber is cut by cleavage.

PATENT DOCUMENTS

[Patent Document 1]
Japanese Unexamined Patent Application, First Publication No. 2014-238574

In the above-described conventional fiber cutter, as work of cutting an optical fiber, it is necessary to perform work of holding the optical fiber by the first optical fiber holder and the second optical fiber holder, applying tension to the optical fiber (operation of a tension applying mechanism or the like), and moving the cutter to form an initial cut in the optical fiber. Therefore, the work of cutting an optical fiber is complicated and there is a possibility of making a mistake in procedures thereof.

SUMMARY

One or more embodiments of the present invention provide an optical fiber cutter capable of cutting an optical fiber without making a mistake in procedures of work.

One or more embodiments of the present invention provide an optical fiber cutter which cuts an optical fiber held by a fiber holder in an extension state, the optical fiber cutter including, a base member, a movable member which clamps the optical fiber extending from the fiber holder and is movable with respect to the base member between an advanced position and a retracted position in an extending direction of the optical fiber, a biasing member which biases the movable member at the retracted position forward, a locking member which regulates forward movement of the movable member at the retracted position, a cutter supporter which supports a blade capable of forming an initial cut in the optical fiber, is moved in a direction intersecting with the extending direction of the optical fiber, and forms the initial cut by the blade at an initial cut forming position between the fiber holder and the movable member in the optical fiber, and an unlocking member which, when the cutter supporter is moved, releases the regulation of forward movement of the movable member by the locking member before the blade reaches the initial cut forming position.

The above configuration includes the unlocking member which, when the cutter supporter is moved, releases the regulation of forward movement of the movable member before the blade reaches the initial cut forming position. Therefore, when the cutter supporter is moved, locking by the locking member is first released, tension is applied to the optical fiber, and then the blade comes into contact with the optical fiber. Therefore, it is possible to simplify work up to cutting the optical fiber, and it is possible to cut the optical fiber without making a mistake in procedures of work.

One or more embodiments of the present invention provide the optical fiber cutter described above, in which the optical fiber cutter may further include a stopper which limits contact of the blade with the optical fiber when the movable member is in front of the retracted position.

According to the above configuration, when the movable member is in front of the retracted position, contact of the blade with the optical fiber is limited. Therefore, it is possible to suppress formation of an initial cut in a state where tension is not applied to the optical fiber.

One or more embodiments of the present invention provide the optical fiber cutter described above, in which the stopper may be movable along with movement of the movable member.

According to the above configuration, the stopper can be operated by disposing the movable member in front of the retracted position.

One or more embodiments of the present invention provide the optical fiber cutter described above, in which the cutter supporter may be rotatable around an axis in an extending direction of the optical fiber.

According to the above configuration, it is possible to contribute to lengthening a usable period of the blade.

One or more embodiments of the present invention provide the optical fiber cutter described above, in which the locking member may include a first locking portion disposed in the base member and a second locking portion disposed in the fiber holder, the first locking portion and the second locking portion may be locked with each other to regulate forward movement of the movable member, and the unlocking member may press at least one of the first locking portion and the second locking portion along with movement of the cutter supporter to release locking between the first locking portion and the second locking portion.

According to the above configuration, it is possible to omit operation of releasing the locking member with simple operation.

One or more embodiments of the present invention provide the optical fiber cutter described above, in which the optical fiber cutter may include a height position regulator which regulates a height position when the blade is in contact with the optical fiber.

According to the above configuration, it is possible to suitably set a distance between the blade and the optical fiber when an initial cut is formed in the optical fiber.

The optical fiber cutter according to one or more embodiments of the present invention can cut an optical fiber without making a mistake in procedures of work.

BRIEF DESCRIPTION OF DRAWINGS

FIG. 8B is a view schematically showing a step of cutting an optical fiber according to one or more embodiments of the present invention.

DETAILED DESCRIPTION

Next, embodiments according to the present invention will be described based on the drawings.

Figure 1:
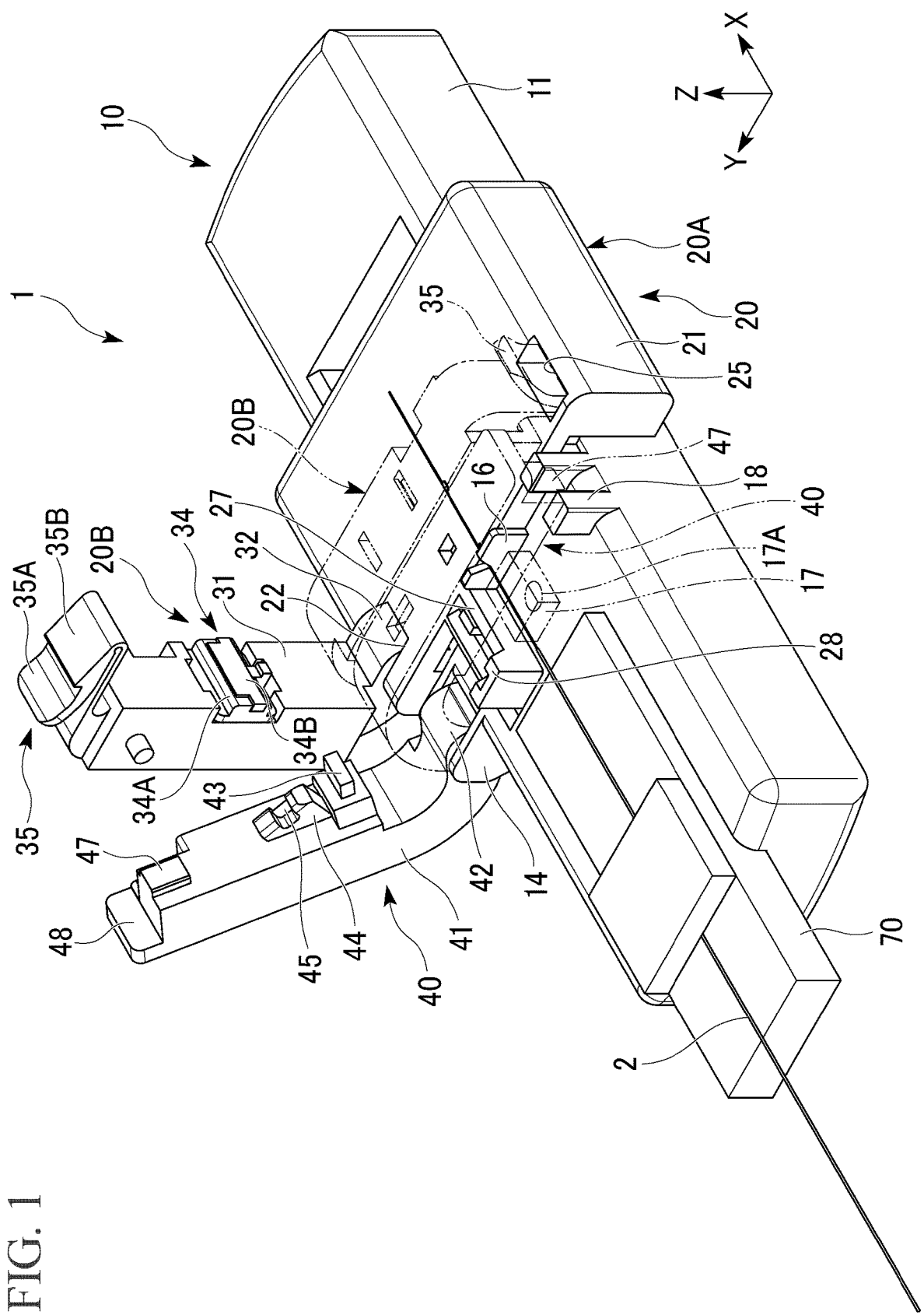
FIG. 1 is a perspective view of an optical fiber cutter according to one or more embodiments of the present invention.
Figure 2:
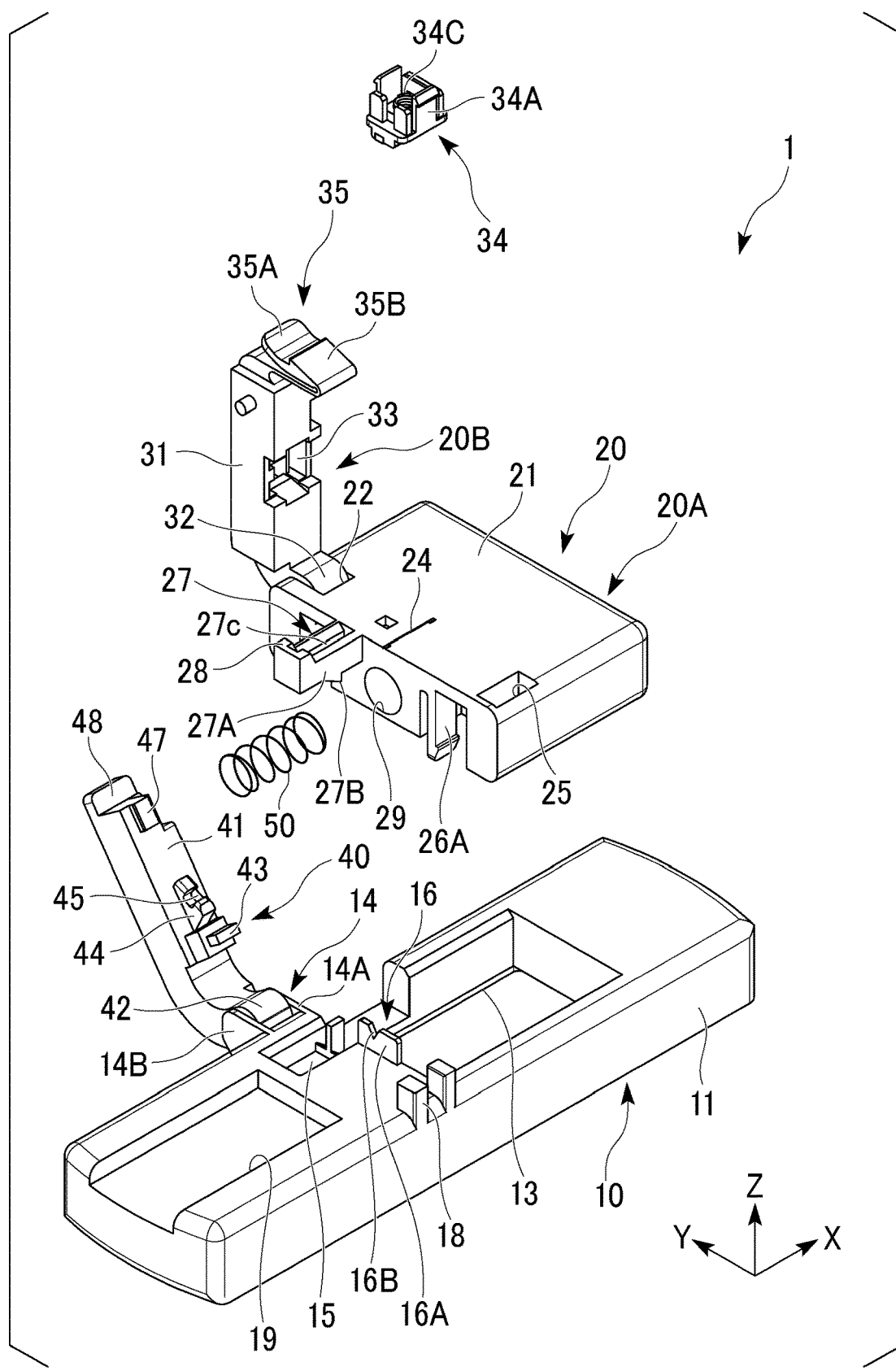
FIG. 2 is an exploded perspective view of the optical fiber cutter according to one or more embodiments of the present invention.
Figure 3:
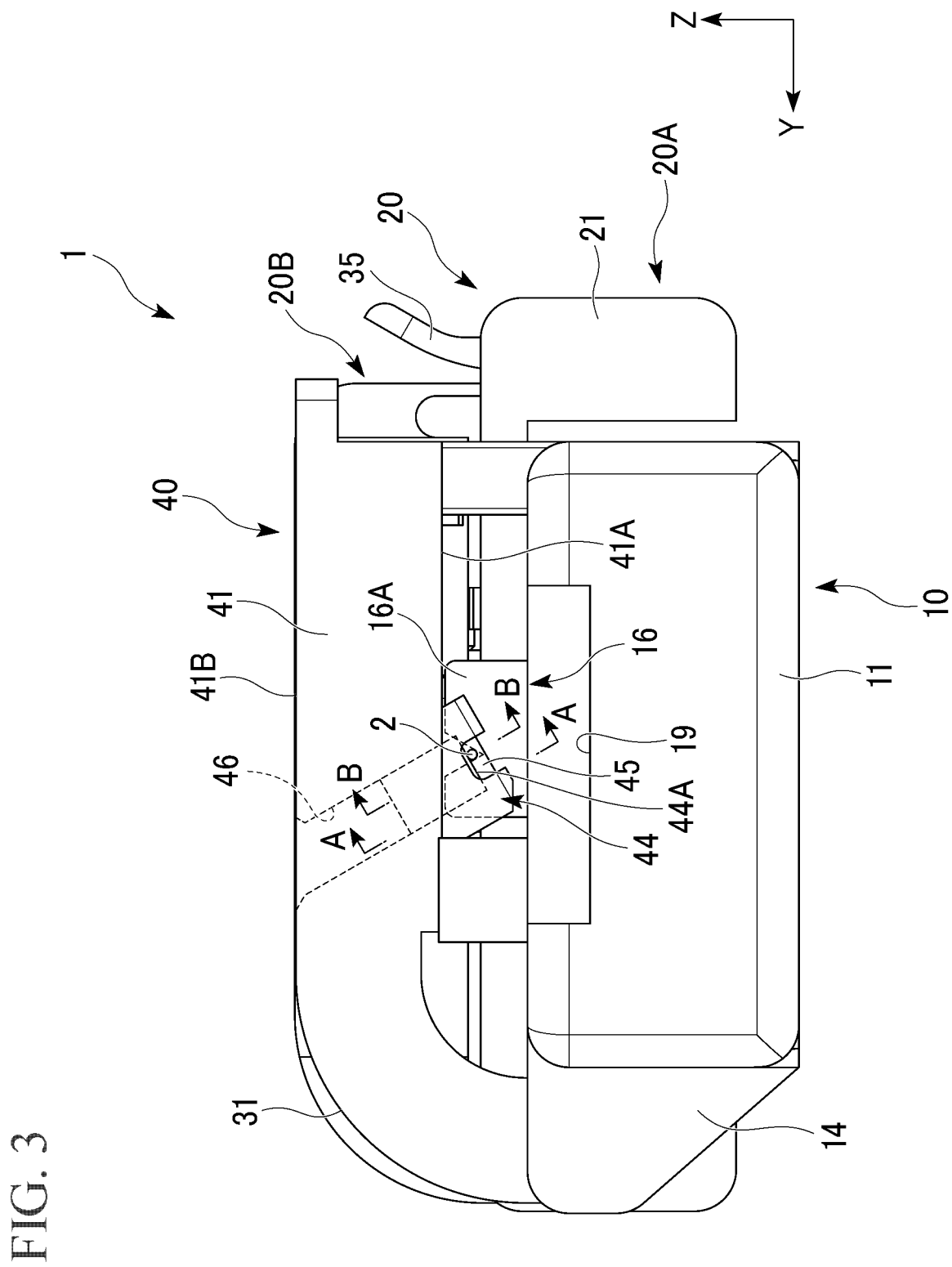
FIG. 3 is a rear view of the optical fiber cutter according to one or more embodiments of the present invention.

FIG. 1 is a perspective view of an optical fiber cutter according to one or more embodiments of the present invention. FIG. 2 is an exploded perspective view thereof. FIG. 3 is a rear view thereof. Incidentally, in the following description, in order to make the invention easily understood, the drawings may sometimes be simplified by appropriately omitting some components, simplifying the shapes, changing the sizes, and the like. A positional relationship among the components will be described by setting an XYZ-orthogonal coordinate system. A description will be provided assuming that, in the XYZ-orthogonal coordinate system, the X direction is a front-rear direction, the Y direction is a left-right direction, and a Z direction is an up-down direction. A description will be provided assuming that the +X side is the front side, the −X side is the rear side, the +Y side is the left side, the −Y side is the right side, the +Z side is the upper side, and the −X side is the lower side. Note that the extending direction of the optical fiber is a direction along the X axis.

As shown in FIGS. 1 to 3, an optical fiber cutter 1 according to one or more embodiments of the present invention includes a base member 10 and a movable member 20. The movable member 20 includes a slider main body 20A and a slider lid 20B. As shown in FIG. 2, an optical fiber holding member 34 is attached to the slider lid 20B.

An initial cut forming member 40 is disposed at the rear of the movable member 20. A blade 45 is attached to the initial cut forming member 40. Furthermore, a spring 50 as a biasing member is disposed between a rear end of the movable member 20 and the base member 10. A fiber holder 70 holding the optical fiber 2 is placed on the base member 10 at the rear of the initial cut forming member 40 of the base member 10. Incidentally, in FIGS. 2 and 3, illustration of the fiber holder 70 is omitted.

The slider lid 20B is brought into a clamping state in which the optical fiber 2 is clamped as indicated by an imaginary line in FIG. 1, and into a non-clamping state in which clamping of the optical fiber 2 is released as indicated by a solid line in FIG. 1 When the slider lid 20B is brought into a clamping state, the slider main body 20A and the slider lid 20B clamp the optical fiber 2. The initial cut forming member 40 may be located at an acting position where the blade 45 disposed in the initial cut forming member 40 reaches an initial cut forming position where an initial cut is formed in the optical fiber 2 as indicated by an imaginary line in FIG. 1, or may be located at a non-acting position other than the acting position as indicated by a solid line in FIG. 1. The blade 45 can form an initial cut between the fiber holder 70 and the movable member 20 in the optical fiber 2.

The movable member 20 is movable in the front-rear direction with respect to the base member 10 between an advanced position and a retracted position. The slider lid 20B is attached to a left end of the movable member 20 and is rotatable around an axis in a moving direction of the movable member 20. The initial cut forming member 40 is attached to a left end of the base member 10 and is rotatable around an axis in the moving direction of the movable member 20.

Figure 4:
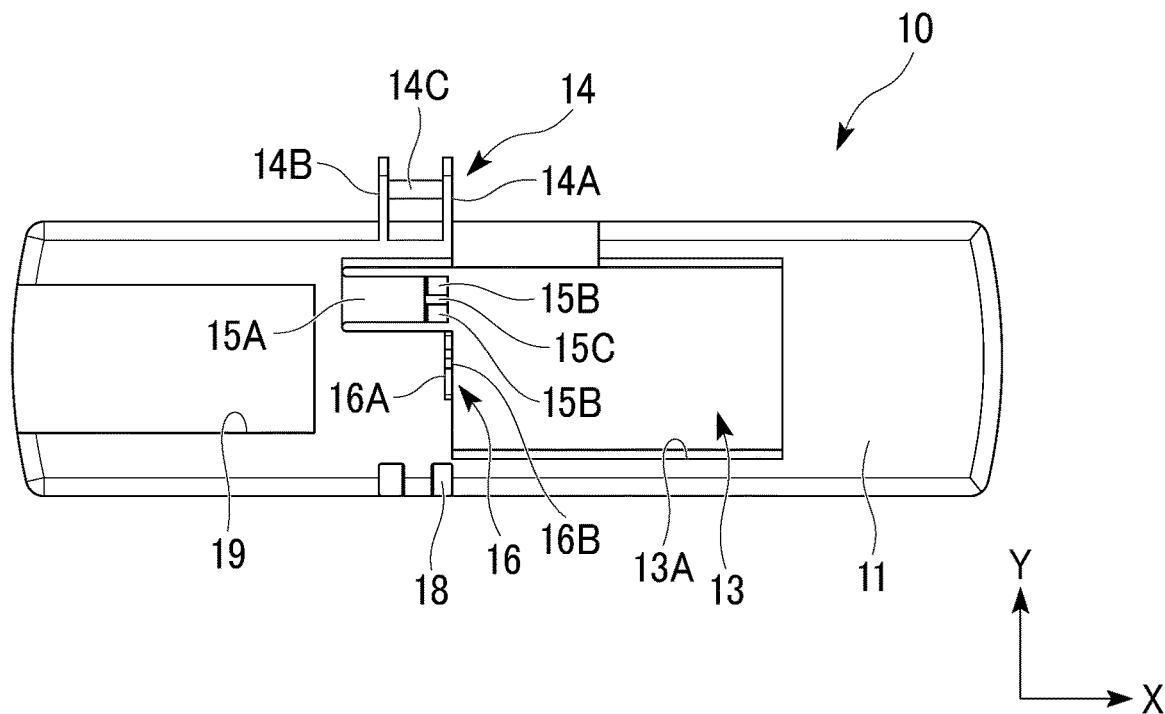
FIG. 4 is a top view of a base member according to one or more embodiments of the present invention.
Figure 5:
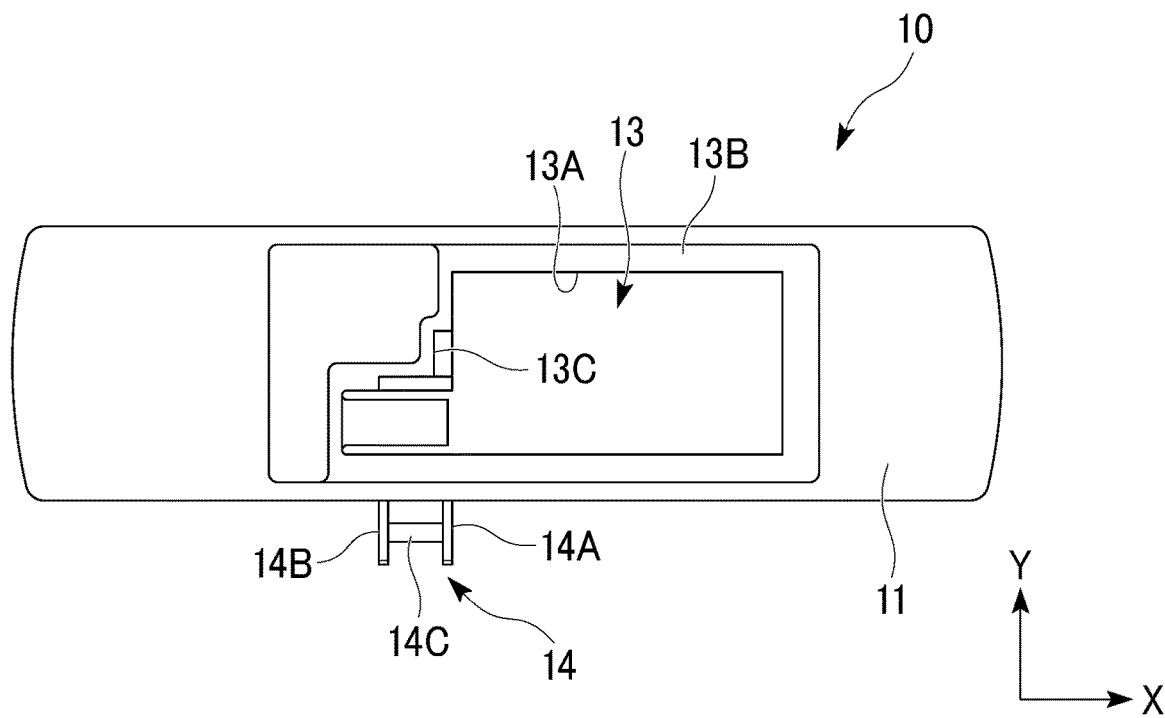
FIG. 5 is a bottom view of the base member according to one or more embodiments of the present invention.

Next, the base member will be described. FIG. 4 is a top view of the base member according to one or more embodiments of the present invention. FIG. 5 is a bottom view of the base member. As shown in FIGS. 4 and 5, the base member 10 includes a base member main body 11 having a substantially rectangular shape as a whole in plan view. A slider mounter 13 is formed at substantially the central portion of the base member main body 11 in the front-rear direction. The slider mounter 13 includes a through portion 13A passing through the base member main body 11 in the up-down direction and a recess 13B formed on a lower surface side of the base member main body 11 and having a slightly larger size than the through portion 13A as viewed from below as shown in FIG. 4. A reaction wall 13C that applies reaction to the spring 50 is formed on a lower surface side of a rear inner wall of the slider mounter 13.

A cutter supporter support 14 is formed at a rear left end of the slider mounter 13 of the base member main body 11. The cutter supporter support 14 includes a pair of brackets 14A and 14B extending in the left-right direction at a position protruding to the left side of the base member main body 11. A cutter shaft member 14C is stretched between the brackets 14A and 14B. The cutter shaft member 14C is disposed in the left-right direction (extending direction of optical fiber). The initial cut forming member 40 is rotatably attached to the cutter shaft member 14C.

A first locking portion 15 is formed on the right side of a position where the cutter supporter support 14 is disposed in the base member main body 11. The first locking portion 15 includes a support plate 15A, a first locking claw 15B disposed at a tip of the support plate 15A, and an unlocking receiving protrusion 15C.

The support plate 15A is an elastically deformable plate-like body having a base end protruding forward from the base member main body 11. The support plate 15A shown in the drawing is formed integrally with the plastic base member main body 11. However, the support plate 15A may be a member separate from the base member main body 11 fixed to the base member main body 11. The first locking claw 15B is disposed on an upper surface at a tip of the support plate 15A. The first locking claw 15B has a substantially triangular shape when viewed from a side, and has a rear surface portion along the up-down direction and an inclined portion formed in front of the rear surface portion.

The unlocking receiving protrusion 15C is a rod-like member disposed at substantially the central position of the first locking claw 15B in the width direction (left-right direction) and extending to a position higher than the first locking claw 15B in the up-down direction. When the unlocking receiving protrusion 15C is pressed from above, the support plate 15A is bent with the base end fixed to the base member main body 11 as a base point. The first locking portion 15 is disposed in the base member main body 11, and the fiber holder 70 is disposed in a fiber holder disposing portion 19 of the base member main body 11. Therefore, the first locking portion 15 is not movable relatively with respect to the fiber holder 70.

An optical fiber positioning member 16 is formed on the right side of a position where the first locking portion 15 is formed in the base member main body 11. As shown in FIG. 2, the optical fiber positioning member 16 includes a plate-like body 16A erected from the base member main body 11 in the up-down direction. A V groove 16B is formed in the plate-like body 16A. When the optical fiber 2 is cut, the optical fiber 2 is housed in a bottom of the V groove 16B to position the optical fiber 2.

A cutter supporter receiving portion 18 is disposed on the right side of the optical fiber positioning member 16. The cutter supporter receiving portion 18 is disposed at a right end of the base member main body 11, and includes a pair of columnar bodies. The cutter supporter receiving portion 18 guides movement of the initial cut forming member 40 at a position close to an operating position.

The fiber holder disposing portion 19 is formed at the rear of the optical fiber positioning member 16. The fiber holder disposing portion 19 is a recess in which the fiber holder 70 holding the optical fiber 2 shown in FIG. 1 can be disposed. The fiber holder 70 is disposed in the fiber holder disposing portion 19, and thereby positioned and placed with respect to the base member main body 11.

Next, the slider main body 20A of the movable member 20 will be described.

The slider main body 20A of the movable member 20 is mounted on the slider mounter 13 formed in the base member main body 11. The length of the through portion 13A of the slider mounter 13 formed in the base member main body 11 in the front-rear direction is longer than the length of the slider main body 20A in the front-rear direction. Therefore, the slider main body 20A can slide between an advanced position and a retracted position in the through portion 13A of the base member main body 11. The slider mounter 13 of the base member 10 serves as a guide portion that guides the slider main body 20A slidably in the front-rear direction. The entire movable member 20 moves in the front-rear direction with respect to the base member 10 along with slide movement of the slider main body 20A with respect to the base member 10 in the front-rear direction.

Figure 6A:
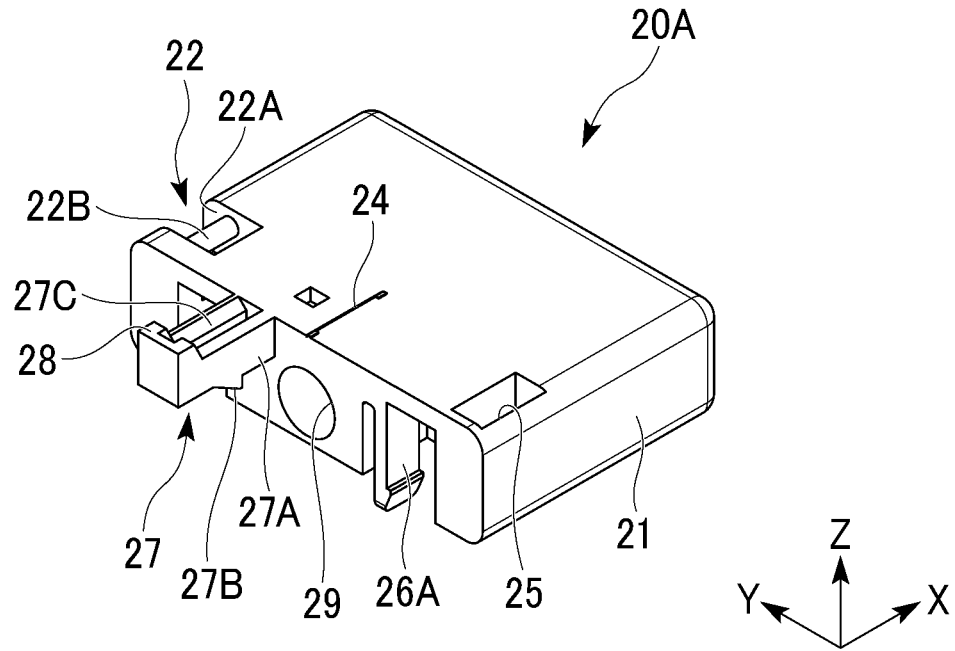
FIG. 6A is a perspective view of a movable member as viewed from above according to one or more embodiments of the present invention.
Figure 6B:
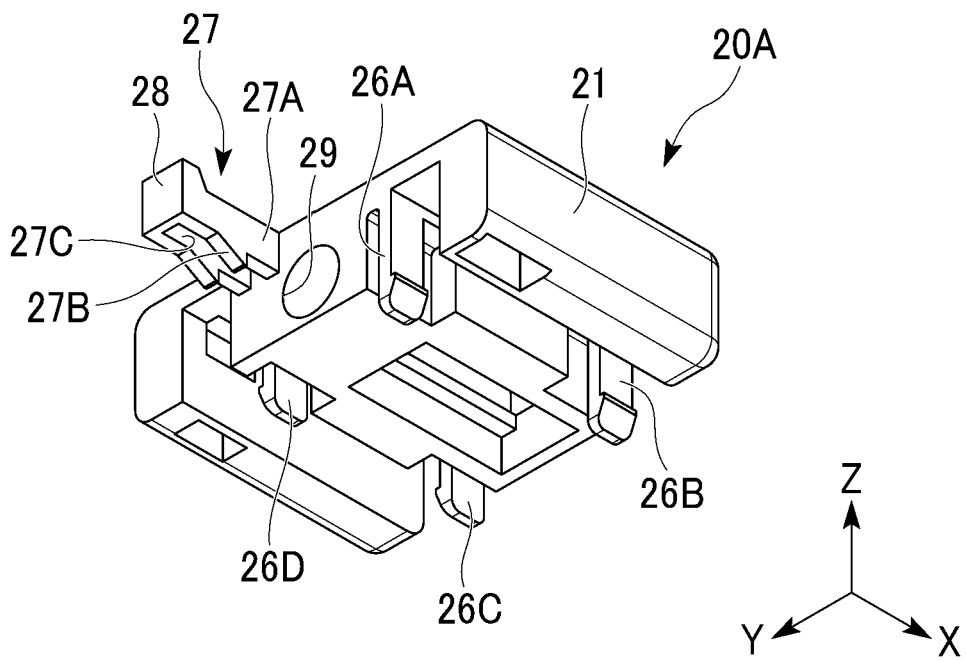
FIG. 6B is a perspective view of the movable member as viewed from below according to one or more embodiments of the present invention.

FIG. 6A is a perspective view of the movable member as viewed from above according to one or more embodiments of the present invention. FIG. 6B is a perspective view of the movable member as viewed from below. As shown in FIGS. 6A and 6B, the slider main body 20A of the movable member 20 includes a slider base 21 having a substantially rectangular shape in plan view. A clamper support portion 22 is formed at a left end on an upper surface side of the slider base 21. The clamper support portion 22 includes a recess 22A formed by cutting out a left end of the slider base 21 and a clamper shaft member 22B connecting a front wall and a rear wall of the recess 22A. The clamper shaft member 22B is disposed in the front-rear direction (extending direction of optical fiber). The slider lid 20B is rotatably attached to the clamper shaft member 22B.

An optical fiber placing groove 24 is formed on the right side of the clamper support portion 22. The optical fiber placing groove 24 is a groove formed on an upper surface of the slider base 21 in the front-rear direction. The optical fiber placing groove 24 is a groove in which the optical fiber 2 to be cut is placed, and has a substantially V-shaped cross section.

A clamper receiving portion 25 is formed on the right side of the optical fiber placing groove 24. The clamper receiving portion 25 is formed at a right end of the slider base 21. The clamper receiving portion 25 includes a clamper receiving recess and a locking plate formed on a right outer wall of the clamper receiving recess. The locking plate is a plate-like member formed so as to protrude inward from a right inner surface of the clamper receiving portion 25. An end of the slider lid 20B is held by such a locking plate to fix the slider lid 20B.

As shown in FIG. 6B, engaging members 26A to 26D are disposed on a lower surface side of the slider base 21. Each of the engaging members 26A to 26D includes an elastic support portion extending in the up-down direction and an engaging portion attached to a lower end of the support portion, and is locked with the recess 13B formed on a lower surface side of the base member main body 11.

An upper end of each of the support portions of the engaging members 26A to 26D is integrally attached to the slider base 21. Each of the engaging portions of the engaging members 26A to 26D is formed so as to protrude outward from the support portion, and the protruding portion engages with the recess 13B formed on a lower surface side of the base member. When the movable member 20 moves, the engaging members 26A to 26D disposed in the slider base 21 move along the recess 13B formed in the base member main body 11, and the movable member 20 thereby moves in the front-rear direction.

A second locking portion 27 is disposed on a rear surface of the slider base 21. The second locking portion 27 includes a support block 27A and a second locking claw 27B formed on a lower surface of the support block 27A. A lower surface of the support block 27A is disposed at substantially the same height position as an upper surface of the support plate 15A in a state where the slider base 21 is assembled with the base member main body 11.

The support block 27A is a block body long in the front-rear direction with a base end protruding rearward from the slider base 21. The second locking claw 27B is disposed on a lower surface of the support block 27A. The second locking claw 27B has a substantially triangular shape as viewed from a side, and has a front surface portion along the up-down direction and an inclined portion formed behind the front surface portion.

A through hole 27C is formed at the central position of the support block 27A in the width direction (left-right direction). The through hole 27C passes through the support block 27A in the up-down direction. The through hole 27C is formed so as to be long in the front-rear direction. The second locking claw 27B is disposed on each of the left and right sides of the through hole 27C on a lower surface of the support block 27A. The unlocking receiving protrusion 15C of the first locking portion 15 is inserted into the through hole 27C from below. The height position of the unlocking receiving protrusion 15C is substantially the same as the height position of an upper surface of the support block 27A.

Figure 7A:
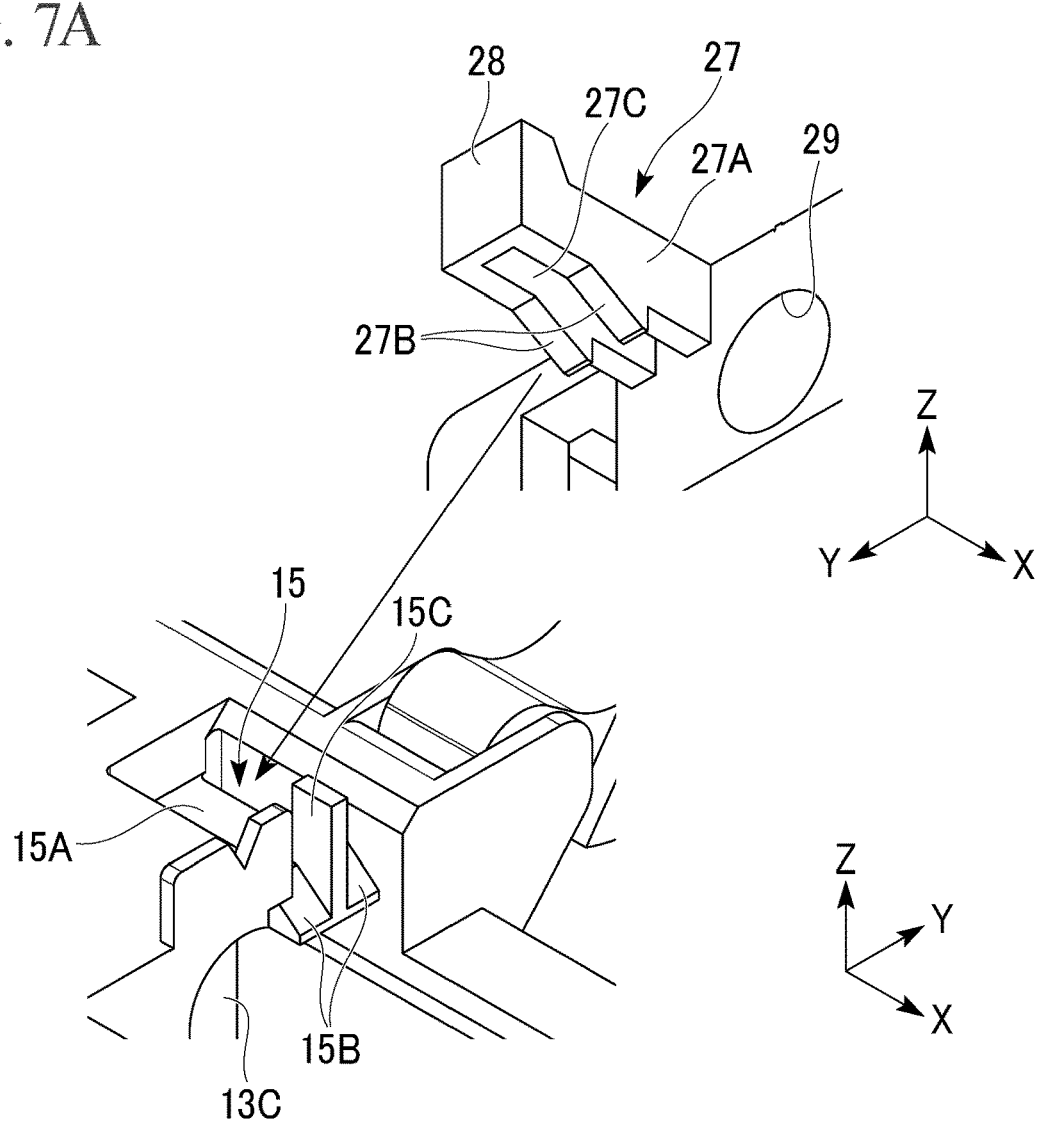
FIG. 7A is an enlarged exploded perspective view of the vicinity of a locking member according to one or more embodiments of the present invention.
Figure 7B:
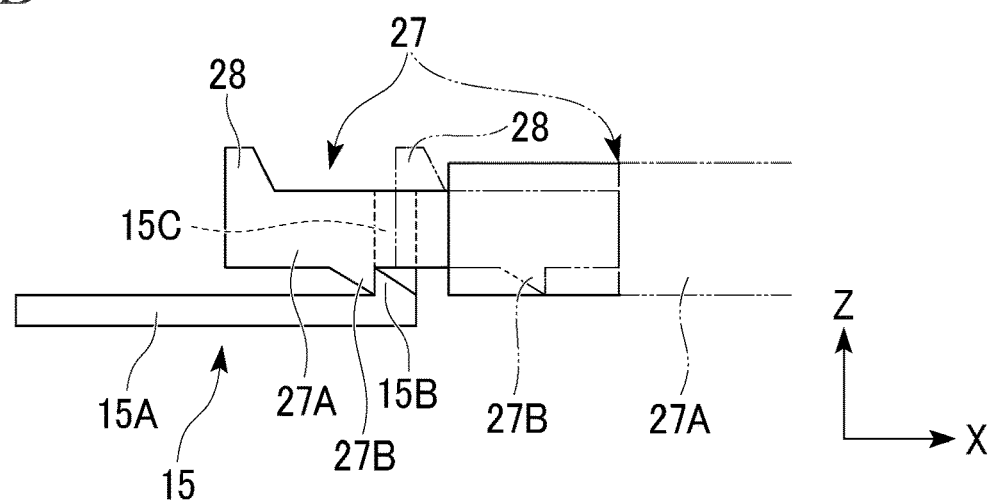
FIG. 7B is a side view of the vicinity of the locking member according to one or more embodiments of the present invention.

FIG. 7A is an enlarged exploded perspective view of the vicinity of a locking member according to one or more embodiments of the present invention. FIG. 7B is a side view of the vicinity of the locking member. As shown in FIG. 7A, the second locking claw 27B is disposed at a position where the second locking claw 27B can be locked with the first locking claw 15B. When the movable member 20 is at an advanced position, as indicated by an imaginary line in FIG. 7B, the second locking claw 27B is disposed in front of the first locking claw 15B, the first locking claw 15B and the second locking claw 27B are not locked with each other, and the movable member 20 is in an unlocked state. When the movable member 20 is at a retracted position, as indicated by a solid line in FIG. 7B, the second locking claw 27B is disposed behind the first locking claw 15B, the first locking claw 15B and the second locking claw 27B are locked with each other, and the movable member 20 is in a locked state in which the movable member 20 is locked and forward movement thereof is regulated.

A stopper 28 is disposed at a rear end of the second locking portion 27. The stopper 28 is formed in a protrusion shape protruding upward at a rear end of the support block 27A. The stopper 28 regulates rotation of the initial cut forming member 40 when the movable member 20 is disposed in front of a retracted position and suppresses contact of the blade 45 with the optical fiber 2. Since the stopper 28 is disposed in the movable member 20, the stopper 28 is movable along with movement of the movable member 20.

As shown in FIGS. 6A and 6B, a spring housing hole 29 is formed in substantially the central portion of a rear surface portion of the slider base 21 in the left-right direction. The spring housing hole 29 is a recess having a circular cross section, and is disposed at a position facing the reaction wall 13C of the base member 10 when the movable member 20 is assembled with the base member 10. The spring housing hole 29 houses the spring 50.

As shown in FIG. 1, the movable member 20 includes the slider lid 20B in addition to the slider main body 20A. As shown in FIGS. 1 and 2, the slider lid 20B includes an elongated clamper main body 31. The clamper main body 31 is disposed in a clamping state in the left-right direction. A clamper grip 32 is disposed at a left end of the clamper main body 31 in a clamping state. The clamper grip 32 grips the clamper shaft member 22B of the movable member 20. The clamper grip 32 grips the clamper shaft member 22B, and the clamper main body 31 is thereby rotatable around the clamper shaft member 22B with respect to the slider base 21. When the clamper main body 31 rotates around the clamper shaft member 22B, the slider lid 20B changes into a clamping state or a non-clamping state.

A holding member housing recess 33 is formed at substantially the central position of the clamper main body 31 in a longitudinal direction. The optical fiber holding member 34 is housed in the holding member housing recess 33. The optical fiber holding member 34 includes a case 34A. A holding member main body 34B is attached to a lower surface side of the case 34A. A pressing spring 34C is housed in the case 34A.

The case 34A includes a locking claw. The locking claw is locked with a locking hole formed on an upper surface side of the holding member housing recess 33 of the clamper main body 31, and the optical fiber holding member 34 is thereby attached to the clamper main body 31. The holding member main body 34B is formed of an elastic member, for example, rubber, and comes into contact with the optical fiber 2 when the optical fiber 2 is clamped by the slider main body 20A and the slider lid 20B. The pressing spring 34C is a compression spring and biases the holding member main body 34B in a direction separating from an upper surface of the clamper main body 31.

A clamper fixing member 35 is disposed at a right end of the clamper main body 31 in a clamping state. The clamper fixing member 35 includes a knob portion 35A and a locking portion 35B. The knob portion 35A has a shape in which a plate-like body is folded back around an axis along the X-axis, and a folded-back portion between an inner piece and an outer piece is elastic. The locking portion 35B is disposed on an outer surface of the outer piece.

The clamper fixing member 35 can be housed in a clamper receiving recess of the clamper receiving portion 25 formed in the slider base 21. When the clamper fixing member 35 is housed in the clamper receiving recess, the inner piece and the outer piece of the knob portion 35A are separated from each other by an elastic force of a folded-back portion. When the inner piece and the outer piece of the knob portion 35A are separated from each other, a locking state in which the locking portion 35B of the clamper fixing member 35 is locked with the locking plate of the clamper receiving portion 25 is brought about. The slider lid 20B is fixed and brought into a clamping state in which the slider lid 20B clamps the optical fiber 2.

When a worker or the like pinches the knob portion 35A, the inner piece and the outer piece of the knob portion 35A come close to each other, and a locking state between the locking portion 35B of the clamper fixing member 35 and the locking plate of the clamper receiving portion 25 is released. At this time, by pulling up the knob portion 35A while pinching the knob portion 35A, the clamper main body 31 rotates, the clamping state of the slider lid 20B is released, and the slider lid 20B is brought into a non-clamping state.

As shown in FIG. 1, the initial cut forming member 40 is attached to the rear of the slider mounter 13 of the base member main body 11. As shown in FIGS. 1 to 3, the initial cut forming member 40 includes an elongated cutter supporter 41. The cutter supporter 41 is disposed in the left-right direction in a state of being at an operating position.

A cutter member grip 42 is disposed at a left end of the cutter supporter 41 at the operating position. The cutter member grip 42 grips the cutter shaft member 14C in the cutter supporter support 14 disposed in the base member main body 11. By gripping of the cutter shaft member 14C by the cutter member grip 42, the cutter supporter 41 can rotate around the cutter shaft member 14C with respect to the base member main body 11. Therefore, the blade 45 attached to the cutter supporter 41 is movable in a direction intersecting with the extending direction of the optical fiber 2 (front-rear direction), for example, in a direction along a surface orthogonal to the optical fiber 2.

The cutter supporter 41 has an unlocking protrusion 43. The unlocking protrusion 43 has a shape slightly smaller than the shape of the through hole 27C formed in the support block 27A. When the movable member 20 is disposed at a retracted position, the unlocking protrusion 43 can enter the through hole 27C. When the movable member 20 is disposed in front of the retracted position, the unlocking protrusion 43 is in contact with the stopper 28 and cannot enter the through hole 27C.

The unlocking protrusion 43 can enter the through hole 27C of the support block 27A from above. When the unlocking protrusion 43 enters the through hole 27C of the support block 27A, the unlocking protrusion 43 presses the unlocking receiving protrusion 15C from above and releases a locked state caused by the first locking claw 15B and the second locking claw 27B. The unlocking receiving protrusion 15C and the unlocking protrusion 43 constitute an unlocking member.

A blade holder 44 is disposed outside the unlocking protrusion 43 of the cutter supporter 41, and the blade 45 is held by the blade holder 44. The blade holder 44 is disposed on a lower surface side of the cutter supporter 41 at an operating position. A blade insertion hole 46 is formed at a position where the blade holder 44 is disposed in the cutter supporter 41. The blade 45 is press-fitted into the blade insertion hole 46, attached to the cutter supporter 41, and held by the blade holder 44.

In the blade 45, as shown in FIG. 3, when the initial cut forming member 40 is at an operating position, a blade tip is formed at a front end thereof, and the rear thereof is tapered. The blade insertion hole 46 into which the blade 45 is press-fitted is formed in a direction inclined with respect to an extending direction of the cutter supporter 41. Since the blade 45 is press-fitted along the blade insertion hole 46, the blade tip of the blade 45 is along a direction inclined with respect to the extending direction of the cutter supporter 41. The extending direction of the cutter supporter 41 is along the width direction (left-right direction) when the initial cut forming member 40 is at an operating position. Therefore, when the initial cut forming member 40 is at an operating position, the blade 45 faces a direction inclined with respect to the width direction (left-right direction).

A fitting protrusion 47 serving as a height position regulator is disposed on a lower side surface in the vicinity of a right end of the cutter supporter 41 at an operating position. The fitting protrusion 47 has substantially the same width as a separation distance of the pair of columnar bodies in the cutter supporter receiving portion 18 formed in the base member main body 11. The fitting protrusion 47 is fitted with the cutter supporter receiving portion 18 when the initial cut forming member 40 is at an operating position or a position close to the operating position. The fitting protrusion 47 disposed in the cutter supporter 41 and the cutter supporter receiving portion 18 disposed in the base member main body 11 guide movement of the cutter supporter 41 when the blade 45 is in contact with the optical fiber 2. By fitting the fitting protrusion 47 with the cutter supporter receiving portion 18, the height position of the blade 45 is regulated to the height position of the optical fiber 2 when the cutter supporter 41 is moved. A handle 48 is disposed at a right end of the cutter supporter 41 at an operating position. Note that a fiber placing base 17 on which the optical fiber 2 is placed, indicated by an imaginary line in FIG. 1, can also be disposed at the rear of the optical fiber positioning member 16 of the base member 10 and below the blade 45 at an initial cut forming position. The fiber placing base 17 can be attached to the base member main body 11 by screwing a screw inserted into a screw insertion hole 17A. The fiber placing base 17 can be attached to and detached from the base member main body 11 by screwing in or removing a screw.

The spring 50 housed in the spring housing hole 29 of the movable member 20 is a compression spring. The length of the spring 50 is longer than a distance between a back wall surface of the spring housing hole 29 and the reaction wall 13C disposed in the base member main body 11 when the movable member 20 is at a retracted position. Therefore, the spring 50 biases the movable member 20 at a retracted position forward.

The fiber holder 70 can be disposed in the fiber holder disposing portion 19 of the base member main body 11. When the optical fiber 2 is cut, the fiber holder 70 holding the optical fiber 2 in an extension state is disposed in the fiber holder disposing portion 19.

Figure 8A:
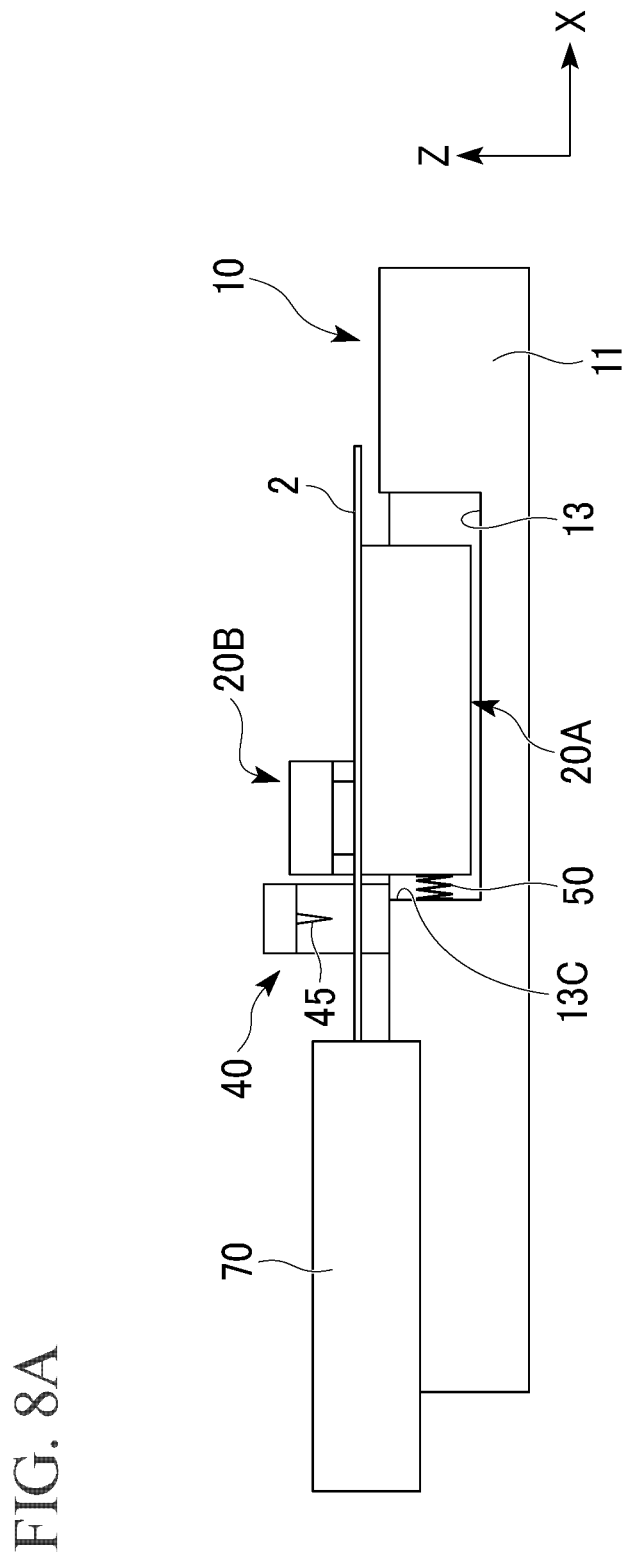
FIG. 8A is a view schematically showing a step of cutting an optical fiber according to one or more embodiments of the present invention.
Figure 8C:
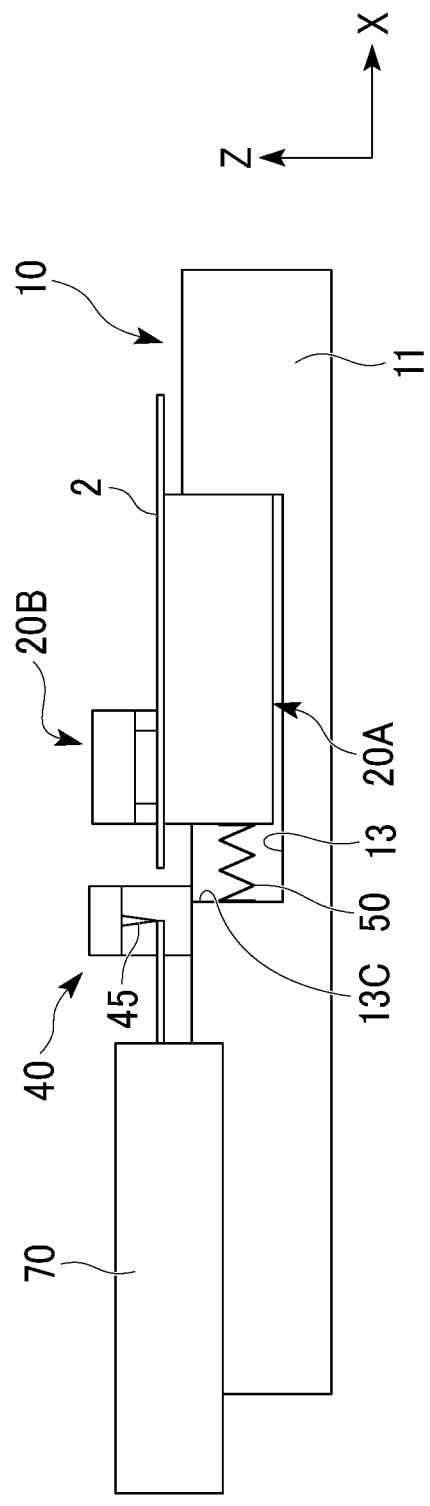
FIG. 8C is a view schematically showing a step of cutting an optical fiber according to one or more embodiments of the present invention.

Next, a procedure for cutting the optical fiber 2 by the optical fiber cutter 1 will be described. FIGS. 8A to 8C are explanatory views schematically showing a step of cutting an optical fiber according to one or more embodiments of the present invention. When the optical fiber 2 is cut, first, the fiber holder 70 holding the optical fiber 2 in an extension state is placed on the fiber holder disposing portion 19 of the base member main body 11. At this time, the movable member 20 is disposed at an advanced position. In addition, the slider lid 20B is in a non-clamping state, and the initial cut forming member 40 is disposed at a non-acting position.

Next, as shown in FIG. 8A, the movable member 20 is moved to a retracted position. The first locking claw 15B disposed in the base member main body 11 and the second locking claw 27B disposed in the slider base 21 are locked with each other to regulate forward movement of the movable member 20. In this way, the movable member 20 is locked. Subsequently, the slider lid 20B in a non-clamping state is rotated around the clamper shaft member 22B to bring the slider lid 20B into a clamping state from the non-clamping state. The slider lid 20B clamps the optical fiber 2.

After the optical fiber 2 is clamped, as shown in FIG. 8B, the initial cut forming member 40 in a non-operating position is rotated around the cutter shaft member 14C and moved from the non-operating position to an operating position. Before the blade 45 reaches the optical fiber 2 in the process of moving the initial cut forming member 40 from the non-operating position to the operating position by rotating operation of the initial cut forming member 40, the unlocking protrusion 43 disposed in the cutter supporter 41 presses the unlocking receiving protrusion 15C disposed in the first locking portion 15. As a result, the first locking portion 15 is pushed down by the unlocking protrusion 43, the locked state between the first locking claw 15B and the second locking claw 27B is released, and regulation of forward movement of the movable member 20 is released.

The spring 50 which is a compression spring is housed in the spring housing hole 29 of the movable member 20. The spring 50 obtains a reaction from the reaction wall 13C of the base member 10 to bias the movable member 20 forward. Therefore, a forward moving force acts on the movable member 20. However, the slider lid 20B disposed in the movable member 20 clamps the optical fiber 2. Therefore, the movable member 20 keeps stopping without moving forward. At this time, tension is applied to the optical fiber 2 by a biasing force of the spring 50.

Subsequently, when the initial cut forming member 40 is further rotated, as shown in FIG. 8C, the blade 45 of the initial cut forming member 40 reaches the optical fiber 2, and the blade 45 forms an initial cut in the optical fiber 2. When the initial cut is formed in the optical fiber 2 with the tension applied, the optical fiber 2 is cleaved from a portion where the initial cut is formed and cut. In this way, the work of cutting the optical fiber 2 is completed.

Figure 9:
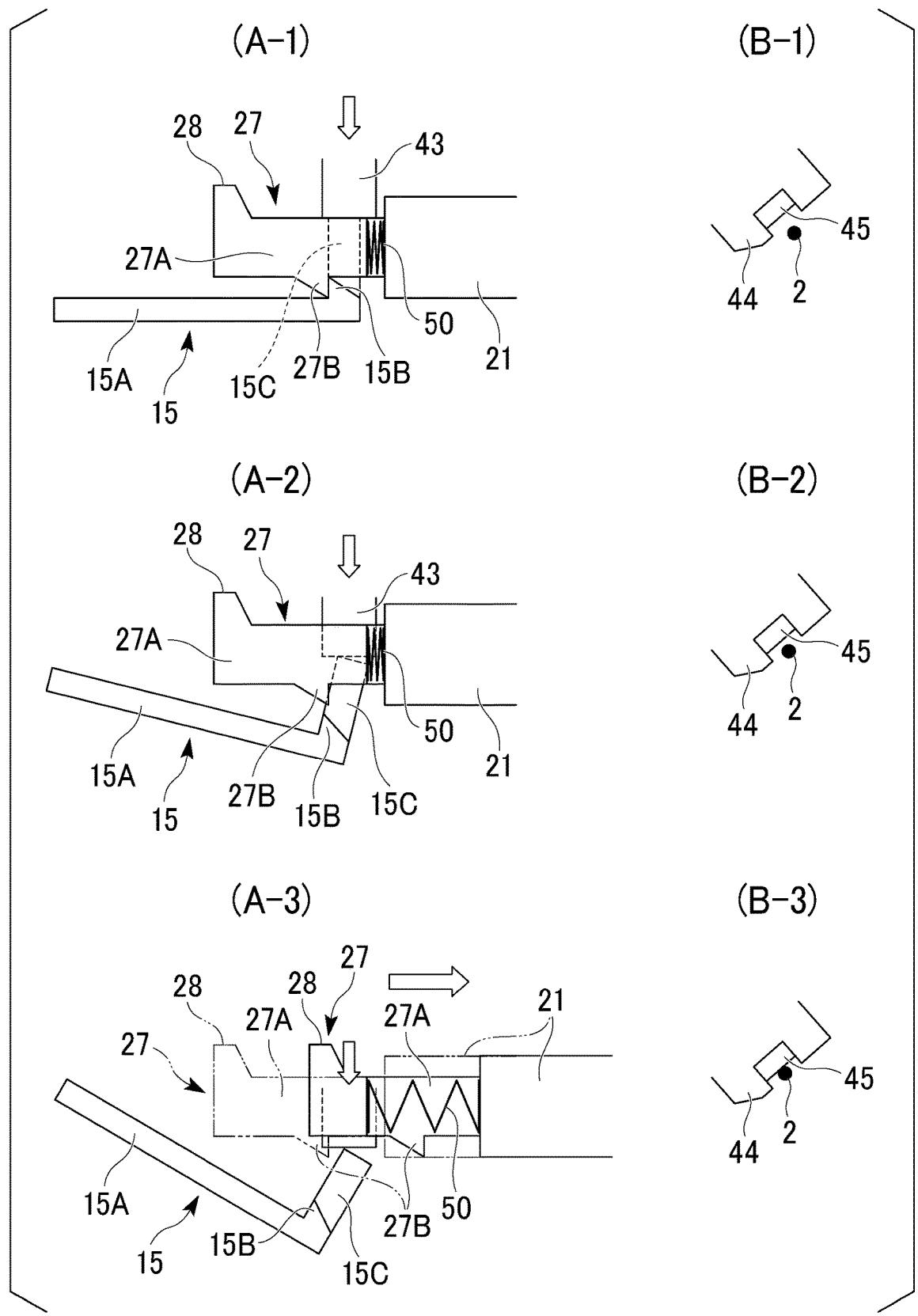
FIG. 9 is a view schematically showing a step of releasing a locking member according to one or more embodiments of the present invention.

Among the steps in which the initial cut forming member 40 is rotated, a step of releasing the movable member 20 from a locked state and cutting the optical fiber 2 will be further described. FIG. 9 is an explanatory view schematically showing a step of releasing a locking member according to one or more embodiments of the present invention. When the initial cut forming member 40 is rotated around the cutter shaft member 14C while the movable member 20 is in a locked state, as shown in the portion (A-1) of FIG. 9, the unlocking protrusion 43 moves toward the unlocking receiving protrusion 15C. At this time, the first locking claw 15B and the second locking claw 27B are locked with each other. As shown in the portion (B-1) of FIG. 9, the blade 45 is in a state before reaching the optical fiber 2.

Subsequently, when the initial cut forming member 40 is further rotated, as shown in the portion (A-2) of FIG. 9, the unlocking protrusion 43 presses the unlocking receiving protrusion 15C downward. The unlocking receiving protrusion 15C is inserted from below into the through hole 27C formed in the support block 27A of the second locking portion 27. The unlocking protrusion 43 having a size slightly smaller than the through hole 27C can enter the through hole 27C. Therefore, by rotating the initial cut forming member 40, the unlocking protrusion 43 enters the through hole 27C to surely come into contact with the unlocking receiving protrusion 15C. The unlocking protrusion 43 can surely press the unlocking receiving protrusion 15C.

Even if the unlocking protrusion 43 presses the unlocking receiving protrusion 15C and lowers the unlocking receiving protrusion 15C to a position where the first locking claw 15B and the second locking claw 27B are released from a locked state, as shown in the portion (B-2) of FIG. 9, the blade 45 is located at a position not reaching the optical fiber 2.

A forward biasing force is applied to the slider base 21 by the spring 50.

However, as shown in FIG. 8B, the slider main body 20A and the slider lid 20B clamp the optical fiber 2, and forward movement of the slider base 21 is thereby limited. In addition, tension by a biasing force of the spring 50 is applied to the optical fiber 2.

Then, as shown in the portion (A-3) of FIG. 9, when the initial cut forming member 40 rotates, as shown in the portion (B-3) of FIG. 9, the blade 45 comes into contact with the optical fiber 2, and the optical fiber 2 is cut by cleavage. At this time, since the tension of the optical fiber 2 is released, the slider base 21 moves forward. Thereafter, the work of cutting the optical fiber 2 is completed. The series of operations so far are performed only by rotating the initial cut forming member 40.

After the work of cutting the optical fiber 2 is completed, the initial cut forming member 40 is rotated from an operating position to a non-operating position. In this process, the unlocking protrusion 43 is pulled out from the through hole 27C formed in the support block 27A. After the unlocking protrusion 43 is pulled out, the slider base 21 further advances by a biasing force of the spring 50 and moves to an advanced position. When the slider base 21 moves to the advanced position, the stopper 28 suppresses movement of the initial cut forming member 40 to the operating position and further suppresses movement thereof to the acting position.

As described above, in the optical fiber cutter 1, after the movable member 20 is moved to the retracted position, forward movement of the movable member 20 is regulated by the locking member, and the slider main body 20A and the slider lid 20B clamp the optical fiber 2. Thereafter, when the initial cut forming member 40 is rotated, first, regulation of forward movement of the movable member 20 by the locking member is released, and tension is applied to the optical fiber 2. Subsequently, when the initial cut forming member 40 is further rotated, the blade 45 comes into contact with the optical fiber 2. Therefore, it is possible to simplify the work up to cutting an optical fiber, and it is possible to cut the optical fiber without making a mistake in procedures of work.

When the movable member 20 is disposed at the advanced position in front of the retracted position, rotation of the initial cut forming member 40 is blocked by the stopper 28. Therefore, the blade 45 can be prevented from coming into contact with the optical fiber 2 when the movable member 20 is in the advanced position. Therefore, it is possible to suppress formation of an initial cut in a state where tension is not applied to the optical fiber 2. In addition, by inclusion of the stopper 28 in the movable member 20, the movable member 20 is disposed at the advanced position, and the stopper 28 can be thereby operated.

The work of forming an initial cut in the optical fiber 2 is performed by bringing the blade 45 into contact with the optical fiber 2. Therefore, when the work of forming an initial cut in the optical fiber 2 by the blade 45 is repeated, the blade 45 is worn out by the contact with the optical fiber 2. When an initial cut is formed in the optical fiber 2, the initial cut forming member 40 repeats similar rotating operations. Therefore, wear of the blade 45 at a predetermined contact position proceeds. Finally, the initial cut forming ability of forming an initial cut in the optical fiber 2 at the contact position is lost.

Here, for example, the cutter supporter 41 is assumed to move in the up-down direction. In this case, the contact position of the blade 45 with the optical fiber 2 is constant. Therefore, contact of the blade 45 with the optical fiber 2 at a position where initial cut forming ability is lost cannot be avoided, and the optical fiber 2 cannot be cut.

Meanwhile, in the optical fiber cutter 1, movement of the initial cut forming member 40 from a non-operating position to an operating position is performed by rotation of the cutter supporter 41 around the cutter shaft member 14C. Therefore, for example, even if the contact position of the blade 45 with the optical fiber 2 is worn out and loses cutting ability, when the cutter supporter 41 is further rotated, the contact position of the blade 45 with the optical fiber 2 slides in the width direction of the blade 45, and the optical fiber 2 comes into contact with the blade 45 at a position where wear has not occurred. In this case, an initial cut can be formed in the optical fiber 2 at a position where wear of the blade 45 has not proceeded.

As described above, even if the contact position of the blade 45 with the optical fiber 2 loses initial cut forming ability, the contact position with the optical fiber 2 sequentially moves in the width direction of the blade 45. Therefore, even if the contact position of the blade 45 loses initial cut forming ability, the contact position is updated to a new position. Therefore, it is possible to contribute to lengthening the usable period of the blade 45.

The locking member includes the first locking claw 15B of the first locking portion 15 and the second locking claw 27B of the second locking portion 27. Therefore, it is possible to regulate movement of the movable member 20 with a simple configuration. The unlocking member includes the unlocking receiving protrusion 15C disposed in the first locking portion 15 and the unlocking protrusion 43 disposed in the cutter supporter 41. Therefore, by only rotating the initial cut forming member 40, it is possible to easily release a locked state between the first locking claw 15B and the second locking claw 27B.

The fitting protrusion 47 is formed at a tip of the cutter supporter 41 of the initial cut forming member 40. The fitting protrusion 47 can be fitted with the cutter supporter receiving portion 18 disposed in the base member main body 11. By fitting the fitting protrusion 47 with the cutter supporter receiving portion 18, the height position of the blade 45 is regulated to the height position of the optical fiber 2 when the cutter supporter 41 is moved. Therefore, it is possible to suitably set a distance between the blade 45 and the optical fiber 2 when an initial cut is formed in the optical fiber 2.

DESCRIPTION OF REFERENCE NUMERALS

1: Optical fiber cutter
2: Optical fiber
10: Base member
11: Base member main body
13: Slider mounter
13C: Reaction wall
15: First locking portion
15A: Support plate
15B: First locking claw (locking member)
15C: Unlocking receiving protrusion (unlocking member)
18: Cutter supporter receiving portion
19: Fiber holder disposing portion
20: Movable member
20A: Slider main body
20B: Slider lid
27: Second locking portion
27A: Support block
27B: Second locking claw (locking member)
27C: Through hole
28: Stopper
40: Initial cut forming member
41: Cutter supporter
43: Unlocking protrusion (unlocking member)
45: Blade
46: Blade insertion hole
47: Fitting protrusion (height position regulator)
50: Spring (biasing member)
70: Fiber holder Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber cutter that cuts an optical fiber held by a fiber holder in an extension state, the optical fiber cutter comprising:
a base member;
a movable member that clamps the optical fiber extending from the fiber holder and that moves with respect to the base member between an advanced position and a retracted position in an extending direction of the optical fiber;
a biasing member that biases the movable member in a forward direction when the moveable member is at the retracted position;
a locking member that regulates forward movement of the movable member at the retracted position;
a cutter supporter that supports a blade that forms an initial cut in the optical fiber, that moves in a direction that intersects with the extending direction of the optical fiber, and that forms the initial cut with the blade at an initial cut forming position between the fiber holder and the movable member;
an unlocking member that, when the cutter supporter is moved, releases the regulation of forward movement of the movable member by the locking member before the blade reaches the initial cut forming position; and
a stopper that limits contact of the blade with the optical fiber by blocking the unlocking member from releasing the locking member to prevent the cutter supporter from moving in the direction that intersects with the extending direction of the optical fiber when the movable member is in front of the retracted position.

2. The optical fiber cutter according to claim 1, wherein the stopper moves along with movement of the movable member.

3. The optical fiber cutter according to claim 1, wherein the cutter supporter rotates around an axis along an extending direction of the optical fiber.

4. The optical fiber cutter according to claim 1, wherein the locking member includes:
a first locking portion disposed in the base member; and
a second locking portion disposed in the movable member,
wherein the first locking portion and the second locking portion are locked together to regulate forward movement of the movable member, and
the unlocking member presses at least one of the first locking portion and the second locking portion along with movement of the cutter supporter to release locking between the first locking portion and the second locking portion.

5. The optical fiber cutter according to claim 1, further comprising:
a height position regulator that regulates a height position when the blade is in contact with the optical fiber.

6. An optical fiber cutter that cuts an optical fiber held by a fiber holder in an extension state, the optical fiber cutter comprising:
a base member;
a movable member that clamps the optical fiber extending from the fiber holder and that moves with respect to the base member between an advanced position and a retracted position in an extending direction of the optical fiber;
a biasing member that biases the movable member in a forward direction when the moveable member is at the retracted position;
a locking member that regulates forward movement of the movable member at the retracted position;
a cutter supporter that supports a blade that forms an initial cut in the optical fiber, that moves in a direction that intersects with the extending direction of the optical fiber, and that forms the initial cut with the blade at an initial cut forming position between the fiber holder and the movable member; and
an unlocking member that, when the cutter supporter is moved, releases the regulation of forward movement of the movable member by the locking member before the blade reaches the initial cut forming position, wherein
the locking member includes:
a first locking portion disposed in the base member; and
a second locking portion disposed in the movable member,
the first locking portion and the second locking portion are locked together to regulate forward movement of the movable member, and the unlocking member presses at least one of the first locking portion and the second locking portion along with movement of the cutter supporter to release locking between the first locking portion and the second locking portion.

\* \* \* \* \*

UNITED STATES PATENT AND TRADEMARK OFFICE
CERTIFICATE OF CORRECTION

PATENT NO. : 10,859,767 B2
APPLICATION NO. : 16/462495
DATED : December 8, 2020
INVENTOR(S) : Takaharu Matsuda et al.

It is certified that error appears in the above-identified patent and that said Letters Patent is hereby corrected as shown below:

On the Title Page

Under (73) Assignee, the second named applicant, NIPPON TELEGRAPH AND TELEPHONE CORPORATION, Tokyo (JP), should be listed.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*